(12) United States Patent
Sato

(10) Patent No.: US 9,318,225 B2
(45) Date of Patent: Apr. 19, 2016

(54) REACTOR CONTAINMENT VESSEL AND BOILING WATER REACTOR POWER PLANT

(75) Inventor: Takashi Sato, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1871 days.

(21) Appl. No.: 11/451,464

(22) Filed: Jun. 13, 2006

(65) Prior Publication Data

US 2007/0092053 A1    Apr. 26, 2007

(30) Foreign Application Priority Data

Jun. 30, 2005  (JP) .................. 2005-191062

(51) Int. Cl.
*G21C 13/00* (2006.01)
*G21C 9/004* (2006.01)
*G21C 13/02* (2006.01)

(52) U.S. Cl.
CPC .............. *G21C 9/004* (2013.01); *G21C 13/022* (2013.01); *G21Y 2002/301* (2013.01); *G21Y 2002/50* (2013.01); *G21Y 2004/30* (2013.01); *Y02E 30/31* (2013.01)

(58) Field of Classification Search
None
See application file for complete search history.

(56) References Cited

U.S. PATENT DOCUMENTS

| 2,991,905 | A | * | 7/1961 | Monson et al. ............... 220/228 |
| 3,454,466 | A | * | 7/1969 | Lemon et al. ................. 376/283 |
| 5,211,906 | A | * | 5/1993 | Hatamiya et al. ............. 376/293 |
| 5,301,215 | A | * | 4/1994 | Gou et al. ...................... 376/283 |
| 2002/0085660 | A1 | * | 7/2002 | Nakamaru et al. ............ 376/283 |

FOREIGN PATENT DOCUMENTS

| CN | 1080426 A | 1/1994 |
| JP | 61-241698 | 10/1986 |
| JP | 62-148890 | 7/1987 |
| JP | 02-281191 | 11/1990 |
| JP | 06-34783 | 2/1994 |
| JP | 2004-333357 | 11/2004 |

OTHER PUBLICATIONS

Friedman et al, "The vapour pressure of liquid nitrogen", Journal of the American Chemical Society, No. 72, Sep. 1950 (pp. 3931-392; only abstract provided.*

(Continued)

*Primary Examiner* — Jack W Keith
*Assistant Examiner* — Sean P Burke
(74) *Attorney, Agent, or Firm* — Oblon, McClelland, Maier & Neustadt, L.L.P.

(57) ABSTRACT

A containment vessel includes a primary containment vessel containing a reactor pressure vessel, an upper secondary containment vessel arranged above the primary containment vessel, and a gas-phase vent pipe linking the primary containment vessel and the upper secondary containment vessel by way of an isolation and connection switching system. The gas-phase vent pipe may be arranged either inside or outside the primary containment vessel and the upper secondary containment vessel. Alternatively, it may be embedded in the wall. An igniter may be arranged in the upper secondary containment vessel. The air in the upper secondary containment vessel may be replaced by nitrogen. A gravity-driven flooding system pool may be arranged in the upper secondary containment vessel and cooling water may be led from the inside of the pool to the inside of the primary containment vessel.

16 Claims, 12 Drawing Sheets

(56) References Cited

OTHER PUBLICATIONS

Silvera et al, "Rotational Excitations in Solid Hydrogen and Deuterium in the Ordered State", Discussions of the Faraday Soceity, No. 48, 1969, pp. 54-60 (UK) only abstract provided.*

Mache, H., "Diffusion and passage of gases in liquids. I. solution and growth of air bubbles in water", Sitzungsberichte der Akademie der Wissenschaften in Wien Mathematisch-Naturwissenschaftliche Klasse (i.e., Proc. Acad.of Sciences in Vienna (Category of Mathematics—Natural Sciences), vol. 138, No. 7 2a, pp. 529-556; Austria (only abstract).*

Computerized translation of Sato et al, JP 2004-333357A, "Reactor Containment Vessel" as made of record by applicant in the Information Dsiclosure Statement filed Jun. 13, 2006, as obtained through the Japan Patent Office (website http://dossier1.ipdl.inpit.go.jp).*

Rahn et al, "A Guide to Nuclear Power Technology—A resource for Decision Making", Krieger Publishing Co., Malabar, Florida 1992, section 17.7: "Design Basis Accidents", pp. 733-735.*

Takashi Sato, et al. "Different variations of a passive safety containment for a BWR with active and passive safety systems", Nuclear Engineering and Design, vol. 235 (20), Sep. 2005, pp. 2125-2139, and cover page.

"ESBWR Design Description", NEDO-33084, Revision 1, General Electric Company, Aug. 2003, 4 Pages.

* cited by examiner

REACTOR CONTAINMENT VESSEL AND BOILING WATER REACTOR POWER PLANT

CROSS REFERENCE TO RELATED APPLICATION

The present invention contains subject matter related to Japanese Patent Application No. 2005-191062, filed in the Japanese Patent Office on Jun. 30, 2005, the entire content of which is incorporated herein by reference.

BACKGROUND OF THE INVENTION

This invention relates to a nuclear reactor containment vessel and a boiling water nuclear reactor power plant with an enhanced level of safety.

A conventional boiling water reactor (BWR) is referred to as active-safety reactor, when its safety system that includes an emergency core cooling system (ECCS) is formed by using active equipment such as a pump. Meanwhile, a BWR is referred to as passive-safety reactor, when its safety system is formed by using only passive equipment such as tanks, and the cooling water stored in the inside is injected into the reactor by gravity.

An advanced BWR (ABWR) is a typical commercial active-safety reactor. Recently, a reactor concept of partly incorporating a passive-safety system for the purpose of cooling the reactor containment vessel has been studied as a new ABWR, as disclosed in Japanese Patent Application Publication No. 2004-333357.

The soundness of the reactor containment vessels of conventional active-safety BWRs can be threatened when a severe accident is considered to take place to go beyond the design basis. The reactor building surrounding the primary reactor containment vessel is not pressure resistant and is not expected to positively function as an outer containment vessel of a double containment structure by design if the soundness of the primary reactor containment vessel were damaged. If the primary reactor containment vessel is provided with vents for the purpose of maintaining the soundness of the primary reactor containment vessel, radioactive substances could partly be discharged into the environment when such an accident occurred.

On the other hand, conventional passive-safety BWRs are not equipped with an active-safety system by design. Although the system cost of the passive-safety system is low, the pressure in the inside of the primary reactor containment vessel could increase once an accident occurred to damage the reactor core, because of non-existence of counter measure such as provision of vents and the large amount of hydrogen generated in the reactor core.

Additionally, the primary reactor containment vessel could be damaged by hydrogen detonation when an accident occurred because hydrogen would be discharged into the equipment room. When contaminated with radioactivity or if the internal atmosphere of a lower equipment room replaced by hydrogen and an accident occurred, it would be difficult for operators to enter the equipment room for restoration activities. The idea of additionally arranging a steel-made secondary reactor containment vessel as a countermeasure to the above-identified problems and discharging hydrogen into it can provide an enhanced level of safety. However, the addition of such a secondary reactor containment vessel would be costly and cumbersome.

It is desirable that the reactor containment vessel of an advanced BWR of the next generation is highly safe by design so that the internal pressure can be held low, no hydrogen detonation can take place and operators are allowed to enter into the equipment room wherever necessary, even if an accident occurred to the reactor core.

Accordingly, it is an object of the present invention to provide an improved reactor containment vessel that is much safer than any existing ones against assumed severe accidents, and also a boiling water reactor power plant realized by using such a containment vessel.

BRIEF SUMMARY OF THE INVENTION

In order to attain the object, according to an aspect of the present invention, a reactor containment vessel comprises: a core; a reactor pressure vessel containing the core; a primary containment vessel containing the reactor pressure vessel; an upper secondary containment vessel arranged above the primary containment vessel; and a gas-phase vent pipe for connecting the primary containment vessel and the upper secondary containment vessel.

According to another aspect of the present invention, a boiling water reactor power plant comprising: a reactor pressure vessel; a primary containment vessel containing the reactor pressure vessel; an upper secondary containment vessel arranged above the primary containment vessel; and a gas-phase vent pipe for connecting the primary containment vessel and the upper secondary containment vessel.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Now, the present invention will be described in greater detail by referring to the accompanying drawings that illustrate preferred embodiments of the present invention. Throughout the drawings, the components that are the same as or similar to each other are denoted by the same reference symbols and will not be described repeatedly.

Figure 1:
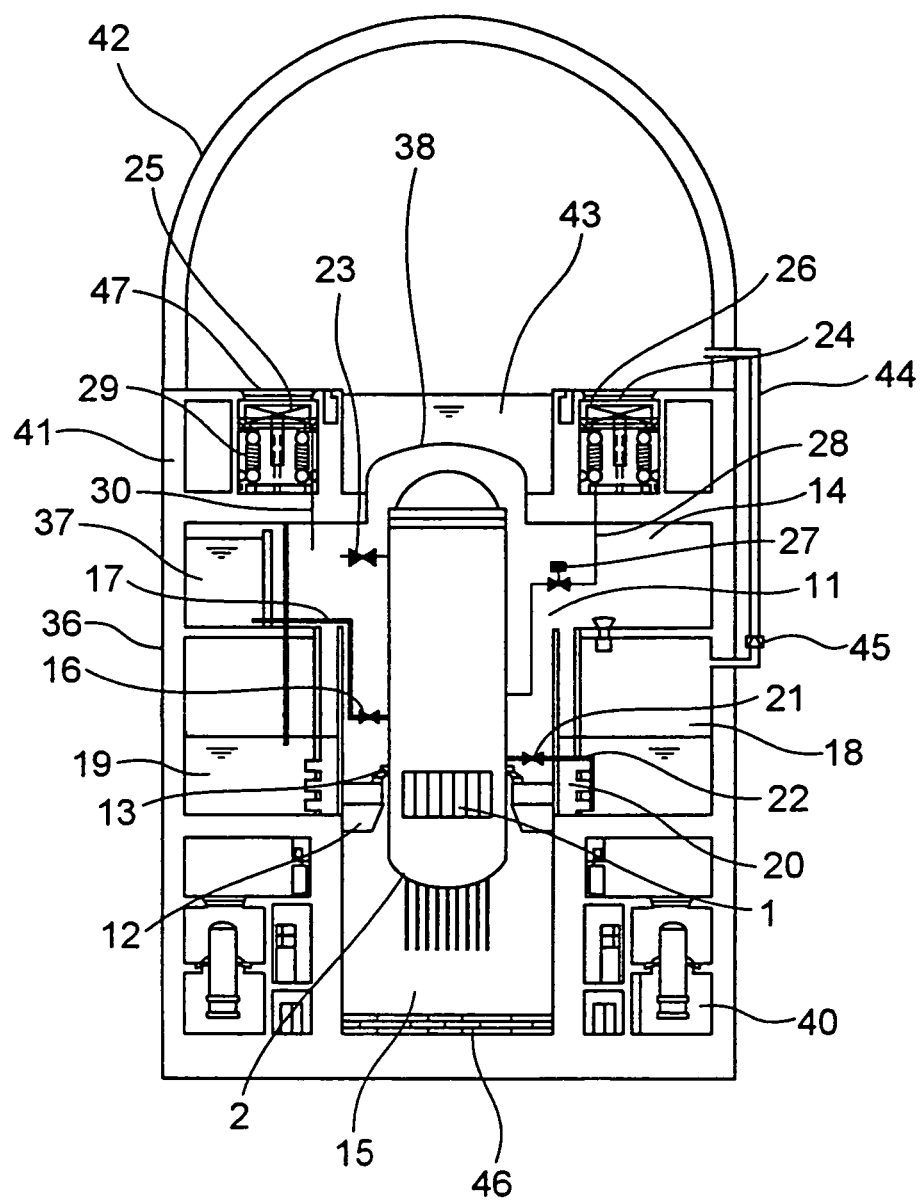
FIG. 1 is a schematic cross sectional elevation view of a first embodiment of a reactor containment vessel according to the present invention.

The first embodiment of a reactor containment vessel (to be referred to simply as containment vessel hereinafter) according to the present invention will be described by referring to FIG. 1. As shown in FIG. 1, a reactor pressure vessel (RPV) 2 that contains a core 1 is arranged in the inside of a dry well 11 and rigidly secured in position by means of a reactor pressure vessel support 12 by way of a reactor pressure vessel skirt 13. The space above the reactor pressure vessel support 12 in the dry well 11 is referred to as upper dry well 14, whereas the space below the reactor pressure vessel support 12 in the dry well 11 is referred to as lower dry well 15.

A core catcher 46 made of thermally resistant material is arranged on the floor of the lower dry well 15. The floor surface of the lower dry well 15 is highly reinforced so as to make it particularly resistant against leakage of and corrosion by radioactive substances.

A gravity-driven cooling system (GDCS) pool 37 is arranged in the upper dry well 14 and is connected to the reactor pressure vessel 2 by way of a pipe 17 with a squib valve 16 arranged on the pipe 17. While the gravity-driven cooling system pool 37 is shown only at the left side in FIG. 1, it is in reality arranged in an area that covers about ⅔ of the floor area of the upper dry well 14 in order to secure a sufficient amount of water in it.

An annular wet well 18 is arranged under the upper dry well 14. An annular pressure suppression pool 19 is arranged in the inside of the wet well 18 so as to contain pool water in it. The dry well 11 and the pressure suppression pool 19 are linked to each other by way of a multitude of vent pipes 20. The water level of the pressure suppression pool 19 is arranged at a position higher than the core 1.

The pressure suppression pool 19 and the reactor pressure vessel 2 are connected to each other by way of a pipe 22 with a squib valve 21 arranged on the pipe 22. The pipe 22 is used to inject water from the pressure suppression pool 19 into the reactor pressure vessel 2 by gravity. When cooling water is injected from the gravity-driven cooling system pool 37 and the pressure suppression pool 19 into the reactor pressure vessel 2, the internal pressure of the nuclear reactor pressure vessel 2 has to be reduced rapidly. Therefore, a multitude of depressurization valves 23 are arranged, although only one of them is shown in FIG. 1. The depressurization valves 23 are also squib valves.

An isolation condenser (IC) pool 24 and a passive containment cooling system (PCCS) pool 25 are arranged above the dry well 11. Each of them stores cooling water. An isolation condenser heat exchanger 26 is arranged in the inside of the isolation condenser pool 24, and is connected to the reactor pressure vessel 2 by way of a pipe 28 with an isolation valve 27 arranged on the pipe 28. Similarly, a passive containment cooling system heat exchanger 29 is arranged in the inside of the passive containment cooling system pool 25 and connected to the gas-phase part of the dry well 11 by way of a suction pipe 30.

Primary containment vessel (PCV) 36 includes the dry well 11 that contains the reactor pressure vessel 2 and the wet well 18 that contains the pressure suppression pool 19. The outer wall part of the primary containment vessel 36 is made of reinforced concrete, and a steel liner (not shown) is arranged on the inner surface of it in order to make it leaktight. The gas-phase part in the inside of the primary containment vessel 36 is replaced by a nitrogen atmosphere in normal operation in order to suppress the oxygen concentration to a low level for the purpose of avoiding deflagration and detonation of hydrogen discharged from the reactor when an accident occurs.

The wet well 18 is arranged at a position higher than the floor of the lower dry well 15, and an equipment room 40 is arranged by using the space under the wet well 18. The equipment room 40 is not included in the primary containment vessel 36.

A primary containment vessel head 38 is arranged in an upper part of the primary containment vessel 36. The primary containment vessel head 38 is made of steel and can be taken off when replacing the fuel of the core 1. Since the primary containment vessel head 38 is made of steel, radiations can partly leak out in upward direction through it when the reactor is in operation. A water shield 43 is arranged in order to shield the radiations. The water shield 43 can attenuate the radiations to a safe level by means of a water pool.

Many conventional BWRs have a concrete-made shield plug arranged at the corresponding part thereof instead of such a water shield. A water shield 43 is used instead of a shield plug in this embodiment for the purpose of eliminating the cumbersome operation of taking off the shield plug and the space required to place the shield plug on the operation floor 47 when replacing the fuel. The water shield 43 is required as long as the reactor is in operation but it is no longer necessary after occurrence of an accident.

Although not shown, a pool-shaped space that is referred to as dryer/separator pit is arranged adjacent to the water shield 43 so as to be used for taking off internal structures such as dryers and separators and temporarily storing them when replacing fuel. The dryer/separator pit is normally empty but is filled with water for the purpose of shielding radiations when storing the dryers and the separators.

A buffer fuel pool (not shown) is also arranged adjacent to the water shield 43 so as to be used for transferring spent fuel when replacing fuel. A spent fuel storage pool (not shown) for storing spent fuel is arranged in a separately arranged fuel pool building (not shown) so that spent fuel is transferred to the spent fuel pool by way of the buffer fuel pool. Thus, the reactor containment vessel can be downsized.

This embodiment does not have any active equipment such as a pump of the emergency core cooling system or an emergency diesel generator that is designed to operate as emergency power source. The core and the primary containment vessel can be cooled by means of natural force such as gravity. Thus, the embodiment provides an excellent advantage that no active equipment can fail even if a loss-of-coolant accident occurs, because it does not have any active equipment. Therefore, it is almost impossible that such an accident ends up with melt down. Since water is injected from the gravity-driven cooling system and the pressure suppression pool by gravity, the embodiment is highly advantageous relative to an active-safety reactor, which can be accompanied by a risk of damaged core if the pump of the emergency core cooling system fails to damage the core. The embodiment is free from such a risk.

This embodiment provides a remarkable advantage of easiness of cooling when a large break loss-of-coolant accident that can rapidly reduce the internal pressure of the reactor pressure vessel 2 occurs. However, in order to inject water from the gravity-driven core cooling system and the pressure suppression pool 19 of the emergency cooling system by gravity, it is necessary to operate the squib valves 16 and 21. The core can be damaged if these valves fail to operate due to a common cause failure. The internal pressure of the reactor pressure vessel 2 is not reduced rapidly if a small break loss-of-coolant accident occurs. Therefore, it is necessary to operate the depressurization valve 23 in order to reduce the internal pressure of the reactor pressure vessel 2 rapidly. The core can be also damaged if the valve 23 fails to operate due to a common cause failure.

Passive-safety reactors have a safety system that is designed to use passive equipment, and hence characterized by being a simple system and rational. However, they are not dramatically safer than active-safety reactors having sufficient redundancy and diversity in plurality of active safety systems. Therefore, this embodiment is designed to arrange a primary containment vessel 36 to carefully secure safety and minimize the public exposure on an assumption that accidents can occur to damage the core due to the above-identified causes, although probability of such an accident may be extremely low. Thus, this embodiment is so designed that the integrity of the primary containment vessel 36 is maintained and radioactive substances are practically not discharged to the environment even if a melt down of core occurs in the primary containment vessel 36.

More specifically, as for steam that is produced when a melt down of core occurs, the steam is lead to the passive containment cooling system heat exchanger 29 by the suction pipe 30 and cooled and condensed there. Thus, this embodiment is so designed that the pressure and the temperature raised in the primary containment vessel 36 when a melt down of core occurs are held to a safe level.

In an aspect, this embodiment is characterized in that a pressure-resistant upper secondary containment vessel 42 is arranged above the primary containment vessel 36 and the gas-phase section of the wet well 18 and the gas-phase section of the upper secondary containment vessel 42 are connected or communicated by means of a gas-phase vent pipe 44. Additionally, the gas-phase vent pipe 44 may be connected to the gas-phase part of the upper secondary containment vessel 42 by way of an isolation and connection switching system (ICSS) 45 in this embodiment.

The upper secondary containment vessel 42 is disposed on top of the primary containment vessel 36 in this embodiment. Thus, the containment vessel 41 is constituted by the vertically combined primary containment vessel 36 and the upper secondary containment vessel 42. The nuclear reactor contained in the primary containment vessel 36 is a BWR that is a passive-safety reactor in the above-description of the embodiment.

The isolation and connection switching system 45 may be realized by using a rapture disk, a vacuum break valve or an automatic isolation valve. A rapture disk is designed to be actuated to break the disk-shaped diaphragm plate arranged in a pipe and allow communication with the atmosphere when a predefined pressure difference takes place. It does not have isolation or closure function after the actuation. In other words, fluid can flow forwardly or backwardly through the rapture disk depending on the pressure difference after the actuation.

A vacuum break valve is a highly reliable gas-phase check valve. It is designed to be actuated to allow communication when a predefined pressure difference takes place but become closed to shut off the flow path when the pressure difference becomes small. Fluid can flow forwardly through the vacuum break valve but not backwardly. It is typically used when the forward communication feature and the backward isolation feature need to be realized highly reliably.

An automatic isolation valve is typically a motor-driven valve or pneumatically driven valve that is designed to be automatically opened and closed when a predefined pressure difference takes place. It can be held to an open state and returned to a closed state after it is opened. If it is a motor-driven valve, it will take some time for actuation. If it is a pneumatically driven valve, it is actuated quickly but an accumulator is required.

It is a matter of choice in the design phase where to arrange the isolation and connection switching system 45 and what type is to be selected. The functional feature that is common to the above-described types of isolation and connection switching system is that they normally provide an isolated sate but begin to allow the atmosphere to flow forwardly when a predefined pressure difference takes place. In other words, any of the above-listed isolation and connection switching systems provide an isolated state when the nuclear reactor is operating normally and the primary containment vessel 36 and the upper secondary containment vessel 42 are separated and independent from each other. Additionally, the isolation and connection switching system 45 will maintain an isolated state if a transitional incident (transient) or a small scale loss-of-coolant accident occurs.

On the other hand, when a large break loss-of-coolant accident or severe accident occurs, the internal pressure of the gas-phase part of the wet well 18 rises. When it has risen to obtain the pressure difference larger than the predefined pressure difference for actuating the isolation and connection switching system 45, the isolation and connection switching system 45 is actuated, which brings the gas-phase part of the wet well 18 and that of the upper secondary containment vessel 42 into communication with each other by way of the gas-phase vent pipe 44. Then, as a result, the non-condensable gas, such as hydrogen and nitrogen, accumulated in the gas-phase part of the wet well 18 is released into the inside of the upper secondary containment vessel 42. Thus, the excessive pressure rise in the primary containment vessel 36 is mitigated.

Alternatively, a higher pressure level may be selected for actuating the isolation and connection switching system 45 so that it may not be actuated at the time of a large break loss-of-coolant accident. With such an arrangement, the isolation and connection switching system 45 is so adapted as to be actuated only when a severe accident takes place to give rise to higher over pressure due to a large amount of hydrogen and not at the time of a design basis accident. Then, the nuclear reactor can be so designed that over pressure is contained within the primary containment vessel 36 in the case of a design basis accident and high over pressure that arises due to a severe accident is withstood by both the primary containment vessel 36 and the upper secondary containment vessel 42.

The upper secondary containment vessel 42 may typically be realized as concrete structure. However, there are no limitations to the material of the upper secondary containment vessel 42 so long as it can secure the pressure resistance and the air-tightness of the upper secondary containment vessel 42. Additionally, the structure of the upper secondary containment vessel 42 may be provided with a liner that is made of steel or formed by resin coating to prevent the leakage of radioactive substances.

While only a pair of gas-phase vent pipe 44 and an isolation and connection switching system 45 are shown in FIG. 1, a plurality of such pairs may be provided along the circumference. Since the upper secondary containment vessel 42 does not contain any equipment to be used to secure the safety of the reactor after an accident, operators are not required to get into the inside of the upper secondary containment vessel 42.

With the embodiment having the above-described configuration, it is possible to maintain the internal pressure of the primary containment vessel 36 low, because the function of pressure boundary against a severe accident is borne not by only the primary containment vessel 36 but shared with the upper secondary containment vessel 42 regardless of provision of the isolation and connection switching system. While the internal pressure exceeds the design pressure if a severe accident occurred in conventional containment vessels, this embodiment can limit the pressure at a severe accident below the design pressure.

The volume of the free space in the upper secondary containment vessel 42 is typically about five to six times of the volume of the free space in the wet well 18. Therefore, the internal pressure of the containment vessel can be suppressed to ⅕ to ⅙ of the conventional level at a severe accident. Thus, it is easily possible to limit the pressure at a severe accident occurs, below the design pressure level.

The internal pressure of conventional containment vessels rises to a level twice as high as the design pressure of the containment vessels if a severe accident occurs, so that the containment vessel needs to be vented. Then, radioactive gases are discharged from the containment vessel to the atmosphere and hence the general public living in the surrounding area might need to be evacuated in order to reduce the risk of exposure to radiations. However, it is possible with this embodiment to suppress the internal pressure of the containment vessel sufficiently low without venting the containment vessel.

The embodiment having the above-described configuration is provided with an isolation and connection switching systems 45. Then, the isolation and connection switching system 45 is not actuated so long as the internal pressure of the primary containment vessel 36 does not rise significantly in the cases of a break of a small diameter pipe and a transient. Therefore, it is possible to contain such an event in the inside of the primary containment vessel 36.

On the other hand, in the case of larger events such as a large pipe break accident or a severe accident where the pressure of the primary containment vessel 36 can rise significantly, the isolation and connection switching system 45 may be actuated to discharge non-condensable gases into the upper secondary containment vessel 42 and make it possible to prevent the pressure of the primary containment vessel 36 from rising significantly.

Since a transient can occur relatively frequently, it is conceivable that the main steam relief valve (not shown) is actuated each time to relief the steam from the reactor into the pressure suppression pool 19 and make it condense so that the radioactive substances in main steam are also moved into the gas-phase part of the wet well 18. However, with this embodiment, it is possible to prohibit the transition of radioactive substances to the gas-phase part of the wet well 18 in a transient. Then, as a result, it is possible to prevent radioactive substances from contaminating the upper secondary containment vessel 42 in a transient.

If the upper secondary containment vessel 42 is contaminated each time a transient occurs, operators might be exposed to radiations when they get into the upper secondary containment vessel 42 and work on the operation floor 47 for a periodical inspection or a refueling operation. This embodiment can eliminate such a problem.

Figure 2:
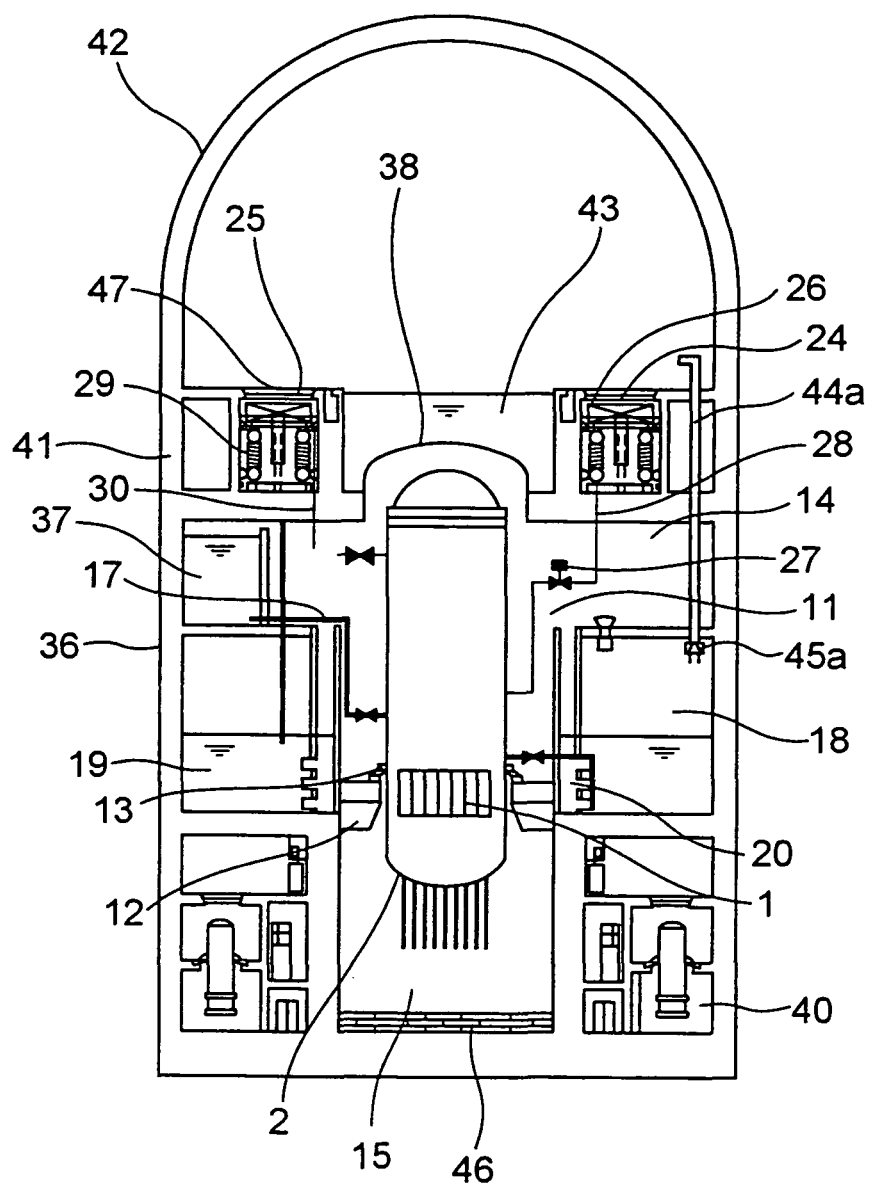
FIG. 2 is a schematic cross sectional elevation view of a second embodiment of a reactor containment vessel according to the present invention.

Now, the second embodiment of the containment vessel according to the present invention will be described by referring to FIG. 2. In this embodiment, the gas-phase vent pipe 44*a* is not arranged outside the containment vessel 41, but it is arranged through the dry well 11 so as to connect the wet well 18 and the upper secondary containment vessel 42. The isolation and connection switching system 45*a* is arranged in the gas-phase part of the wet well 18. With this arrangement, the gas-phase vent pipe 44*a* does not extend to the outside of the containment vessel 41, so that it is possible to avoid radioactive substances from leaking into the environment through the gas-phase vent pipe 44*a* even if an accident occurs.

Figure 3:
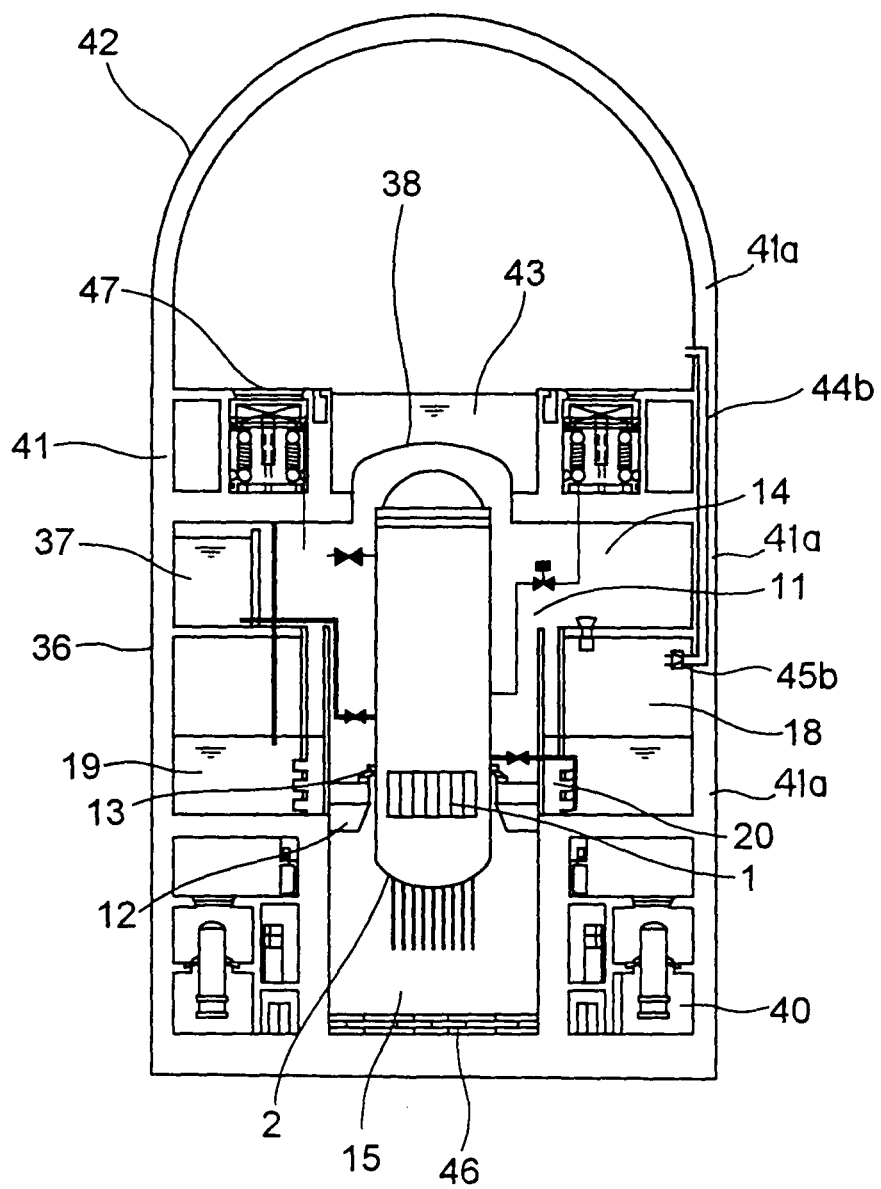
FIG. 3 is a schematic cross sectional elevation view of a third embodiment of a reactor containment vessel according to the present invention.

Now, the third embodiment of the containment vessel according to the present invention will be described by referring to FIG. 3. In this embodiment, the upper secondary containment vessel 42 and the primary containment vessel 36 are integrally formed as a single structure of the containment vessel 41. Additionally, the gas-phase vent pipe 44*b* is embedded in the outer wall 41*a* of the containment vessel 41. As depicted in FIG. 3, the outer wall 41*a* comprises an outer wall part of the dry well 11, an outer wall part of the wet well 18, and the upper secondary containment vessel 42.

With this arrangement of the embodiment, the containment vessel 41 is realized as an integrated single structure to provide an advantage of an enhanced strength. As the gas-phase vent pipe 44*b* is embedded in the outer wall 41*a*, the overall structure can be designed very compact. The maintenance of the isolation and connection switching system 45*b* can be conducted easily because it is located in the gas-phase part. Alternatively, the isolation and connection switching system 45*b* may be placed in an opening space that is formed in the outer wall 41*a*.

Figure 4:
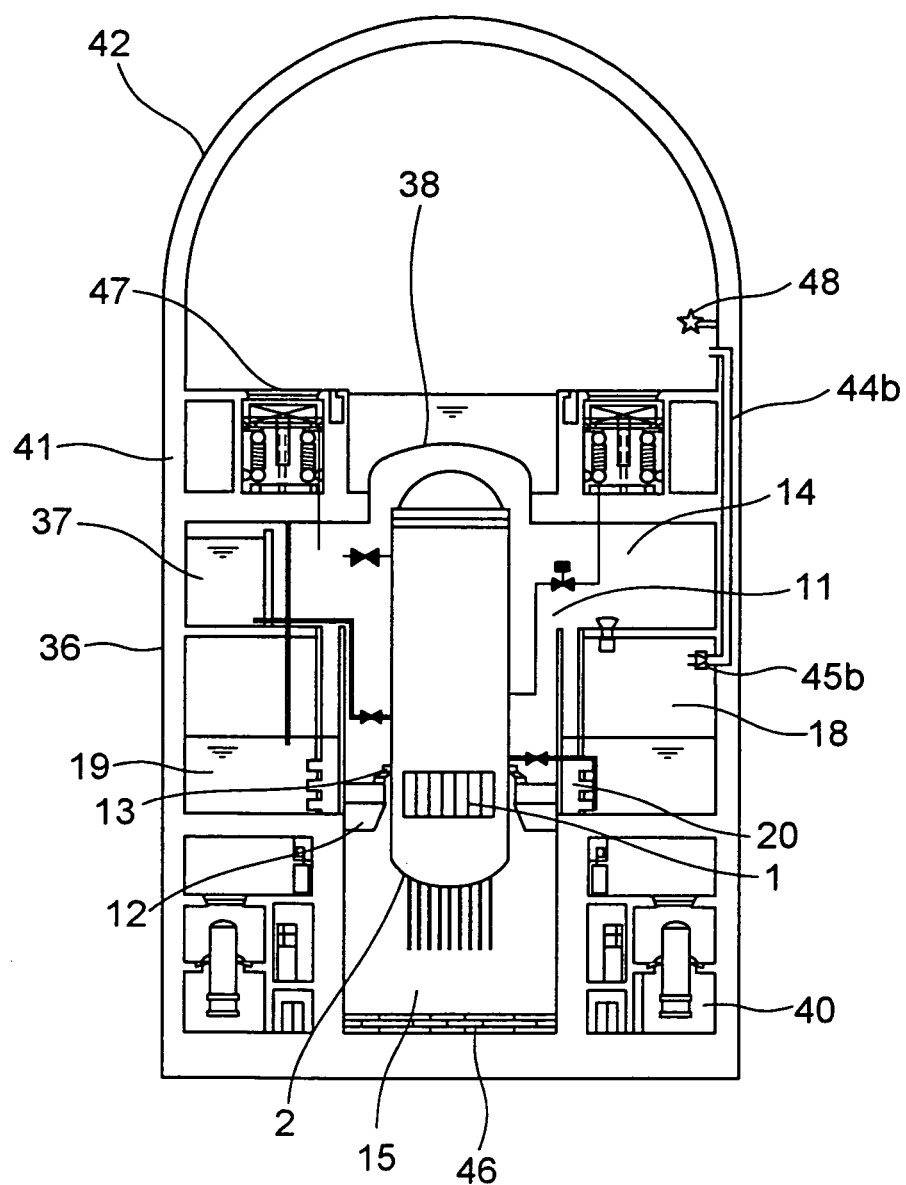
FIG. 4 is a schematic cross sectional elevation view of a fourth embodiment of a reactor containment vessel according to the present invention.

Now, the fourth embodiment of the containment vessel according to the present invention will be described by referring to FIG. 4. In this embodiment, an igniter 48 is arranged near the exit of the gas-phase vent pipe 44*b* in the upper secondary containment 42. The igniter 48 may be a device for ignition that uses a battery (not shown) as a power source. It may be structurally similar to the ignition plug of the gasoline engine of an automobile.

The purpose of arranging the igniter 48 is that, when the isolation and connection switching system 45*b* is actuated by the pressure of a large volume of hydrogen that is pressurized in the gas-phase part of the wet well 18 and the hydrogen is discharged into the upper secondary containment vessel 42 by way of the gas-phase vent pipe 44*b*, the igniter 48 positively ignites the hydrogen to make it burn.

The gases that are discharged from the gas-phase vent pipe 44*b* is mostly hydrogen and the balance is nitrogen. The oxygen concentration is limited to a low level. This is because the atmosphere of the inside of the primary containment vessel 36 is replaced by nitrogen in normal operation to reduce the oxygen concentration under control, so that hydrogen may not burn even if a large amount of hydrogen is generated in an accident. Therefore, if mixture gas that contains hydrogen to a high concentration level is discharged into the upper secondary containment vessel 42 and left there without control, the hydrogen concentration in the upper secondary containment vessel 42 rises. Then, the hydrogen can eventually react with the oxygen in the upper secondary containment vessel 42 to give rise to detonation, and then the produced shock wave may destroy the upper secondary containment vessel 42.

In this embodiment hydrogen is discharged from the gas-phase vent pipe 44*b*, and can be combusted immediately and successively in a stable manner by means of the igniter 48.

Therefore, it is possible to control the hydrogen concentration in the upper secondary containment vessel 42 and prevent it from rising. Then, detonation of hydrogen is prevented to by turn prevent the upper secondary containment vessel 42 from being destructed. This is the same rational that gas burns in a stable manner on a gas cooker of a domestic gas supply system in a room without any trouble but it can detonate if it is accumulated in the room to a sufficiently high concentration and then ignited.

Figure 5:
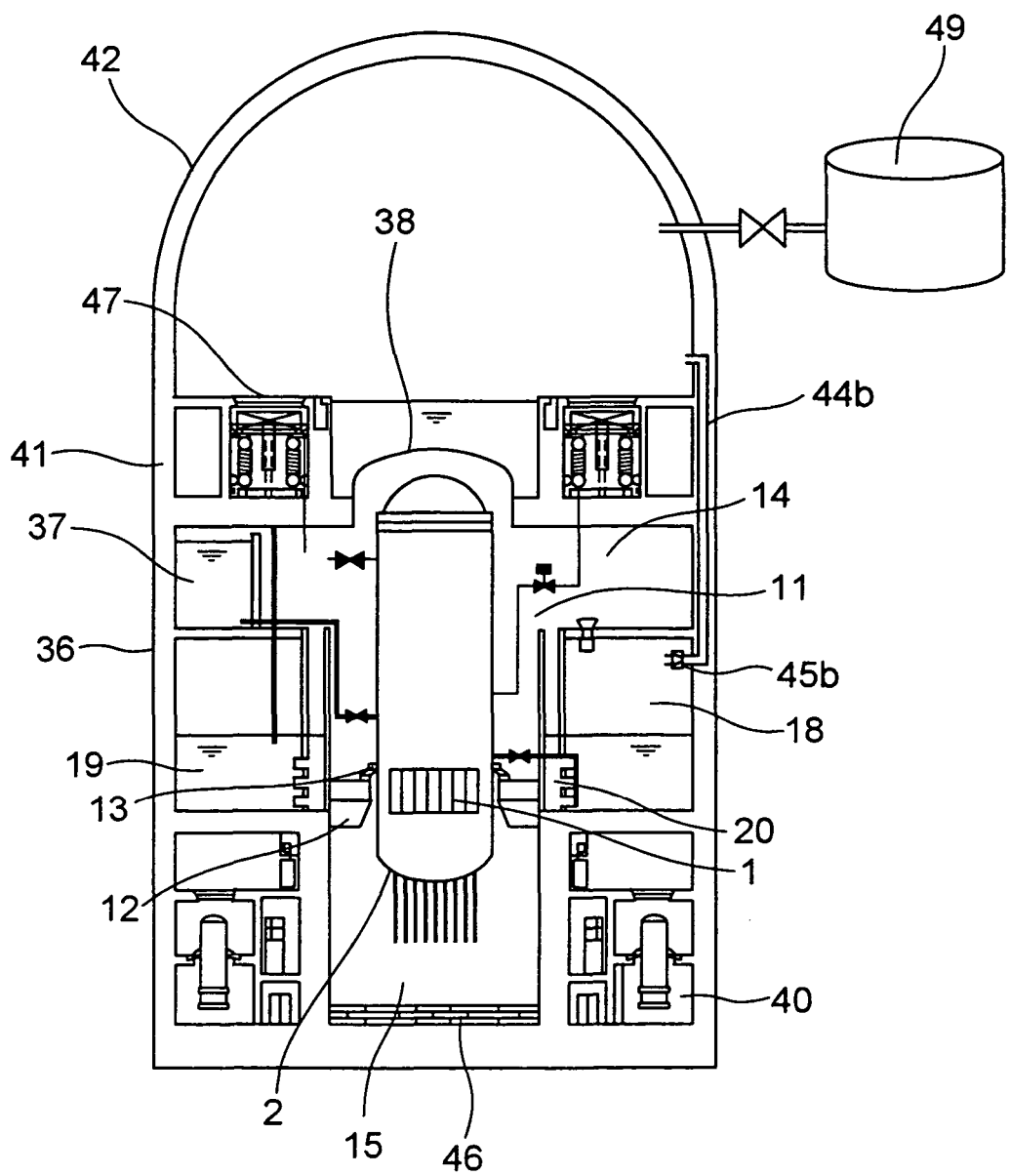
FIG. 5 is a schematic cross sectional elevation view of a fifth embodiment of a reactor containment vessel according to the present invention.

Now, the fifth embodiment of the containment vessel according to the present invention will be described by referring to FIG. 5. This embodiment is characterized in that nitrogen gas is supplied from nitrogen gas supply system 49 into the upper secondary containment vessel 42 to reduce the oxygen concentration in the upper secondary containment vessel 42 in advance when the plant starts normal operation. The nitrogen gas supply system 49 may also be used to maintain the oxygen concentration in the primary containment vessel 36 to a low level.

The design concept of this embodiment will be described below. When the isolation connection switching system 45b is actuated in a severe accident, a large amount of hydrogen gas transfers into the inside of the upper secondary containment vessel 42. The atmosphere of the primary containment vessel 36 is replaced by nitrogen gas to reduce the oxygen concentration even when there is no accident in conventional BWRs. In other words, BWRs are designed to be able to prohibit any hydrogen detonation even if a large amount of hydrogen gas is generated from the core in an accident. This is an excellent advantage of BWRs in terms of safety.

However, if the isolation and connection switching system 45b is actuated to release a large amount of hydrogen into the upper secondary containment vessel 42, hydrogen detonation may occur particularly when the atmosphere in the upper secondary containment vessel 42 is air and hence the oxygen concentration is significantly high there. This is one of the major risks in a severe accident that are common to pressurized water reactors (PWRs) where the atmosphere in the containment vessel is air and not inerted with nitrogen during normal operation.

The above-cited risk may be avoided to a certain extent if hydrogen is intentionally combusted stably by means of an igniter as in the case of the above-described fourth embodiment. However, the hydrogen combustion may not be sufficient and detonation can occur if a large amount of hydrogen is generated very rapidly. To eliminate such a high risk design, it is more reliable and safer to inert the atmosphere of the upper secondary containment vessel 42 with nitrogen and reduce the oxygen concentration when the plant is operating as described above.

In the case of a PWR, the free volume of the containment vessel is about 80,000 m³ and it is difficult to inert the atmosphere with nitrogen. However, in the case of the upper secondary containment vessel 42, it is easy to inert the atmosphere with nitrogen because the free volume of it is about 20,000 m³, which is equivalent to that of a conventional primary containment vessel 36.

With this embodiment having the above-described configuration, it becomes practically possible to keep the atmosphere inerted with nitrogen in the upper secondary containment vessel 42 reducing the oxygen concentration during normal operation, and thus completely eliminate the risk of hydrogen detonation in a severe accident. Nitrogen may be alternatively supplied after the occurrence of an accident from the nitrogen supply system 49, for example, by actuating a nitrogen accumulator. Such a measure is possible because there is a time delay for initiation of a large amount of hydrogen generation from the core at a core damage accident.

Figure 6:
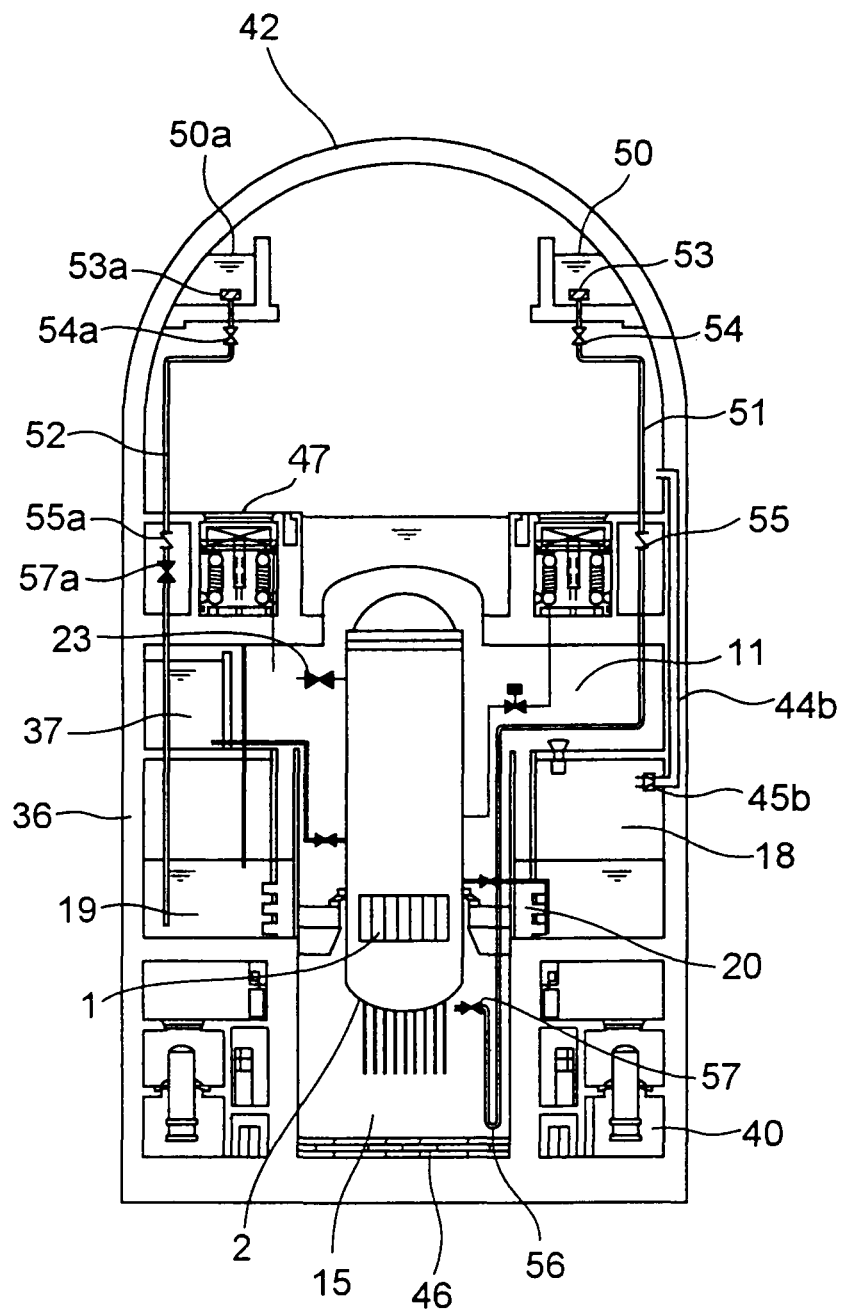
FIG. 6 is a schematic cross sectional elevation view of a sixth embodiment of a reactor containment vessel according to the present invention.

Now, the sixth embodiment of containment vessel according to the present invent ion will be described by referring to FIG. 6. This embodiment is characterized in that gravity-driven containment vessel flooding system pools 50, 50a are arranged in the inside of the upper secondary containment vessel 42. As depicted in FIG. 6, the gravity-driven containment vessel flooding system pools 50, 50a have water surfaces opened directly to the gas-phase above the operation floor 47 in the upper secondary containment vessel 42. The gravity-driven containment vessel flooding system pools 50, 50a may optionally be circularly integrated with each other or separated from each other as independent pools. Cooling water is stored in the gravity-driven containment vessel flooding system pools 50, 50a, which are connected to the dry well 11 by way of a dry well drain pipe 51, and to the wet well 18 by way of a wet well drain pipe 52.

The dry well drain pipe 51 is adapted to lead cooling water from the inside of the gravity-driven containment vessel flooding system pool 50 into the lower dry well 11 by gravity sequentially by way of a strainer 53, an upstream valve 54, a check valve 55, a U-shaped seal 56 and an squib valve 57 bypassing the reactor pressure vessel 2 as depicted in FIG. 6. However, the internal pressure of the primary containment vessel 36 may rise up, to about 3.5 atm (atmosphere) in a loss-of-coolant accident and to about 8 atm in a severe accident. Therefore, it is unrealistic (practically impossible) to inject cooling water into the primary containment vessel 36 from the outside simply by means of gravity. To inject water simply by means of gravity against the internal pressure of about 8 atm, it would be necessary to place the pool at a level higher than the primary containment vessel 36 at least by about 80 m. Then, nuclear reactor building would have to be made as high as 150 m. Thus, it is unrealistic or extremely difficult to build such a tall nuclear reactor building although it might be theoretically possible.

However, in this embodiment, the internal pressure of the wet well 18 rises to actuate the isolation and connection switching system 45b in an accident so that noncondensable gases are discharged from the wet well 18 into the upper secondary containment vessel 42 by way of the gas-phase vent pipe 44b. With this arrangement, the pressure of the upper secondary containment vessel 42 is raised to become almost equalized to the pressure of the wet well 18. Thus, the pressure difference between the upper secondary containment vessel 42 and the primary containment vessel 36 becomes almost nil. Then, as a result, it is possible to inject water from the gravity-driven containment vessel flooding system pool 50 into the primary containment vessel 36 by gravity. Thus, it is possible to cool the damaged core debris that falls into the lower dry well 15 in a severe accident.

However, if a loss-of-coolant accident or a severe accident takes place in the primary containment vessel 36, steam will be generated by the residual heat of the core. Then, the pressure of the dry well 11 will be held slightly higher than that of the wet well 18, and the pressure difference is determined by the submergence of the vent pipe 20 and will be about 0.1 atm after the pressure is stabilized in an accident.

After the isolation and connection switching system 45b is opened, the pressure of the upper secondary containment vessel 42 is equalized with that of the wet well 18 and the pressure difference from the dry well 11 also becomes about 0.1 atm. Although this pressure difference slightly resists the drop of the water from the gravity-driven containment vessel flooding system pool 50, the gravity-driven containment vessel flooding system pool 50 can inject its water in to the wry well 11 by gravity owing to the potential energy of the water, because it is arranged at a position sufficiently higher than the dry well 11 (the level difference from the injecting point is not less than 20 m). Keeping a level difference of about 1 m is sufficient to overcome the pressure difference of 0.1 atm. Thus, all the water stored in the gravity-driven containment vessel flooding system pool 50 is injected into the primary containment vessel 36 by gravity.

However, when all the water stored in the gravity-driven containment vessel flooding system pool 50 falls down, the dry well drain pipe 51 starts functioning as a vent pipe (gas-phase pipe) and firstly equalizes the pressure of the upper secondary containment vessel 42 and that of the dry well 11. Then, as a result, the pressure of the dry well 11 and that of the wet well 18 are also equalized with each other because the wet well 18 is connected with the upper secondary containment vessel 42 by way of the gas phase vent pipe 44b. If such a phenomenon took place, the passive containment cooling system would lose its cooling function. That is because it is designed to passively cool the containment vessel by using the pressure difference between the dry well 11 and the wet well 18 as driving force, and the driving pressure difference disappears.

Therefore, conventionally, it is necessary to carefully design a BWR in such a way that, when cooling water is injected into the dry well 11 by way of a liquid-phase pipe from the wet well 18 or the space whose pressure is equalized with the wet well 18, the liquid-phase pipe should not function as gas-phase pipe after all the stored water has been injected, in order to prevent the loss of the pressure difference between the dry well 11 and the wet well 18.

However, this embodiment dissolves this problem by arranging the U-shaped seal 56 and the check valve 55 in combination. If all the water stored in the gravity-driven containment vessel flooding system pool 50 has fallen, cooling water is left in the part of the U-shaped seal 56 to maintain the water-sealed condition, so that it is possible to avoid a situation where the dry well drain pipe 51 is completely turned to operate as gas-phase pipe. Additionally, if the pressure in the dry well 11 transitionally rises to drive the water-sealing water in the U-shaped seal 56 to flow backward and push it up toward the gravity-driven containment vessel flooding system pool 50, the check valve 55 is closed immediately to prevent the back flow.

Therefore, since this embodiment is provided with the gravity-driven containment vessel flooding system pool 50, it is possible to safely inject cooling water into the dry well 11 whose internal pressure has risen in an accident only by gravity and, when all the cooling water has been injected, it is possible to maintain the pressure difference between the dry well 11 and the wet well 18 and secure the safety feature of the passive containment cooling system.

Alternatively, if the front end of the dry well drain pipe 51 is connected to the reactor pressure vessel 2, it is possible to actuate the depressurization valve 23 to reduce the internal pressure of the reactor pressure vessel 2 and subsequently inject cooling water from the gravity-driven containment vessel flooding system pool 50 into the reactor pressure vessel 2 to cool the core fuel.

On the other hand, it is possible to drain the water stored in the gravity-driven containment vessel flooding system pool 50a into the wet well 18 in a similar manner. However, the water-sealing feature of the U-shaped seal is not necessary because cooling water is injected from a space to another space whose internal pressure have been equalized by actuating the isolation and connection switching system 45b. The wet well drain pipe 52 is adapted to lead water from the inside of the gravity-driven containment vessel flooding system pool 50a into the suppression pool 19 by gravity sequentially by way of a strainer 53a, an upstream valve 54a, a check valve 55a, a squib valve 57a bypassing the reactor pressure vessel 2 as depicted in FIG. 6.

In this embodiment the upper secondary containment vessel 42, the gravity-driven containment vessel flooding system pools 50, 50a, the U-shaped seal 56 and the check valve 55 are arranged, as described above. Therefore, it is possible to inject cooling water only by gravity into the primary containment vessel 36 whose internal pressure has been raised by an accident. It is also possible to cool the fuel of the core 1 in the reactor pressure vessel 2, to cool the damaged core debris dropped on the floor of the lower dry well 15 by flooding water, and to supply water to the pressure suppression pool 19 and to the gravity-driven cooling system pool 37 from the outside of the primary containment vessel 36.

Additionally, it is possible to reduce the capacity of the gravity-driven cooling system pool 37 arranged in the inside of the primary containment vessel 36, because water can be replenished by the gravity-driven containment vessel flooding system pool 50 in this embodiment. The gravity-driven cooling system pool 37 takes almost all the internal space of the upper dry well 14 in the existing BWRs, and hence, it is difficult to arrange equipment in the upper dry well 14. However, since the gravity-driven cooling system pool 37 of this embodiment can be downsized, it is easy to arrange equipment in the upper dry well 14.

Figure 7:
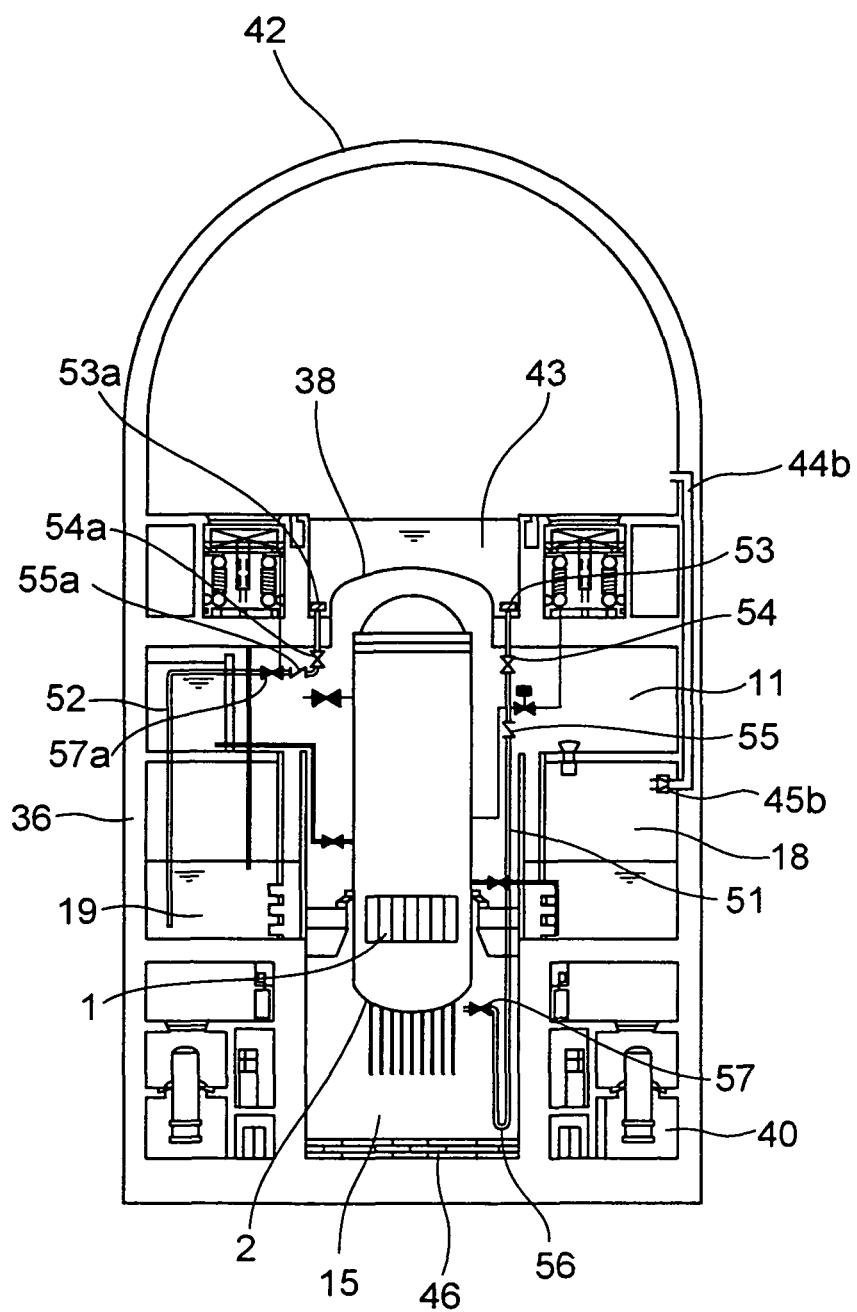
FIG. 7 is a schematic cross sectional elevation view of a seventh embodiment of a reactor containment vessel according to the present invention.

Now, the seventh embodiment of the containment vessel according to the present invention will be described by referring to FIG. 7. This embodiment is characterized in that a water shield 43 is employed as water source in stead of the gravity-driven containment vessel flooding system pools 50, 50a. Once the internal pressure of the upper secondary containment vessel 42 is made substantially equal to that of the primary containment vessel 36 by means of the gas-phase vent pipe 44b, it is possible to inject water from the water source in the upper secondary containment vessel 42 into the primary containment vessel 36 by gravity if there is a level difference of not less than 1 m. Therefore, it is also possible to inject water from the water shield 43 arranged above the primary containment vessel head 38 into the primary containment vessel 36. Strainers 53, 53a are arranged in the water shield 43 and water can be injected into the dry well 11 and the wet well 18 by gravity respectively, by way of a dry well drain pipe 51 and a wet well drain pipe 52.

An upstream valve 54, a check valve 55, a U-shaped seal 56 and a squib valve 57 are arranged along the dry well drain pipe 51 to prevent water from flowing backward and to inject water directly into the lower dry well 15 or the reactor pressure vessel 2. Additionally, an upstream valve 54a, a check valve 55a and a squib valve 57a are arranged along the wet well drain pipe 52, so that water may be supplied from the water shield 43 to the pressure suppression pool 19 and so on.

Although not shown, it is also possible to fill the dryer separator pit constantly with water which is located adjacent to the water shield 43. The water in the dryer separator pit can be used as source of water supply in stead of the water shield 43. Although not shown either, it is also possible to use the buffer fuel pool that is arranged for refueling as source of water supply.

Thus, with this embodiment having the above-described configuration, it is possible to cause cooling water to fall into the primary containment vessel 36 by gravity and cool the fuel in the core 1 and the primary containment vessel 36 when an accident occurs, without additionally arranging a gravity-driven containment vessel flooding system pool. It is a structural disadvantage to arrange an overhanging gravity-driven cooling system pool in the dome part of the upper secondary containment vessel 42 from the point of view of earthquake-resistant design, and this embodiment provides an advantage of safety feature similar to such a cooling system by utilizing the existing water shield 43 as source of water supply.

Figure 8:
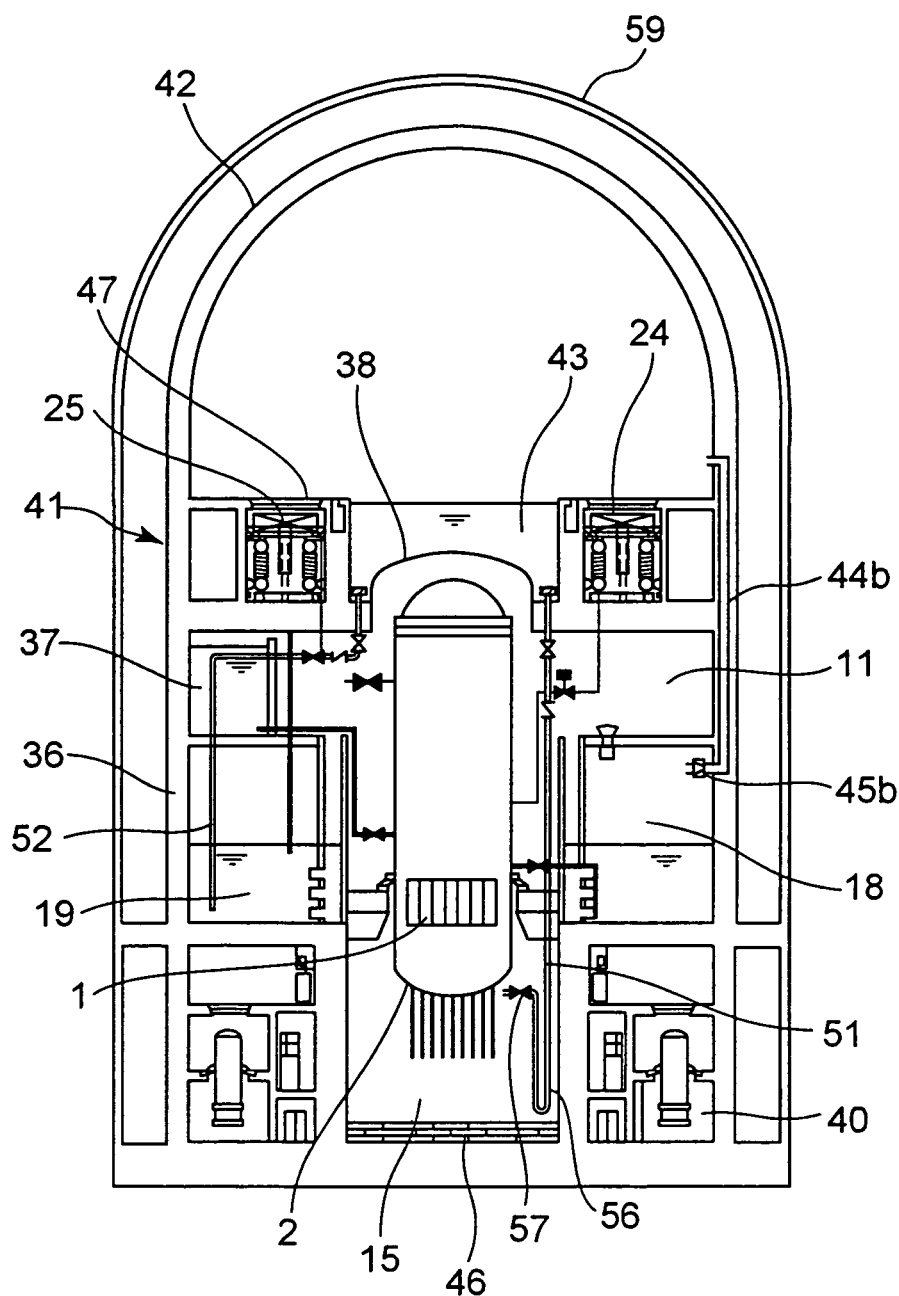
FIG. 8 is a schematic cross sectional elevation view of an eighth embodiment of a reactor containment vessel according to the present invention.

Now, the eighth embodiment of the containment vessel according to the present invention will be described by referring to FIG. 8. This embodiment is characterized by being provided with a concrete-made external event shield 59 additionally at the outside of the containment vessel 41.

With this embodiment having the above-described configuration, it is possible to maintain the integrity of the containment vessel 41 and the internal facilities against a large airplane crash including a large passenger plane. In this embodiment, both the upper secondary containment vessel 42 and the primary containment vessel 36 of the containment vessel 41 are typically made to have a wall thickness of about 1.5 m. This is a sufficient wall thickness against a small aircraft crash such as a fighter plane, because a wall thickness of 1.3 m of concrete is generally acceptable for the purpose of withstanding a small aircraft crash. On the other hand, it is generally believed that a wall thickness of 1.8 m is required to withstand a large aircraft crash including a large passenger plane. In this embodiment, the external event shield 59 is made to have a wall thickness of 0.6 m and the containment vessel 41 has a wall thickness of 1.5 m to make the total wall thickness equal to 2.1 m, which is sufficient against a large aircraft crash including a large passenger plane.

Although a similar effect can be achieved by providing the containment vessel 41 with a wall thickness of 2.1 m, the containment vessel 41 is rather made to have a double wall structure in this embodiment because the external event shield 59 can have an additional radiation leakage protection effect. The external event shield 59 can accommodate a lighter external incident such as an external gas explosion. Then, the containment vessel 41 that is more important from the safety point of view can maintain its soundness without being subjected to any impact in such an incident. Additionally, the reactor has to be so designed that operators can access to the operation floor 47 by means of an elevator for the purpose of fuel replacement or the like, an elevator can be installed in the inside of the external incident shield 59.

Figure 9:
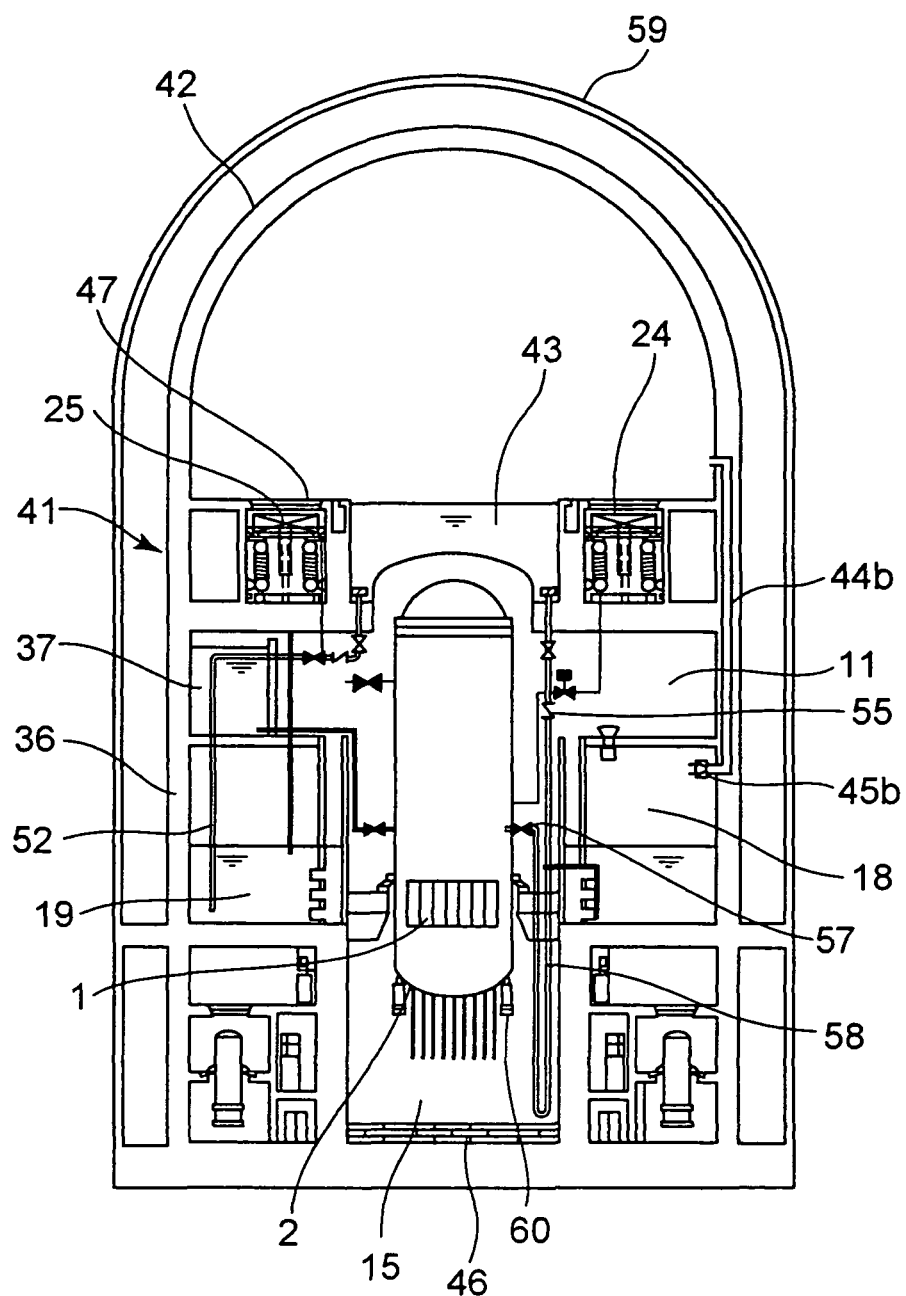
FIG. 9 is a schematic cross sectional elevation view of a ninth embodiment of a reactor containment vessel according to the present invention.

Now, the ninth embodiment of the containment vessel according to the present invention will be described by referring to FIG. 9. This embodiment is a modification of the eighth embodiment (FIG. 8) and is characterized by being provided with about ten reactor internal pumps 60 arranged under the reactor pressure vessel 2. With this embodiment having the above-described configuration, it is possible to forcibly supply cooling water to the core 1 to make the output power of the nuclear reactor as high as 1700 MWe. However, as the loaded amount of core fuel is increased, the amount of hydrogen that is generated in a severe accident would also be increased proportionally. Generation of a large amount of hydrogen in conventional passive-safety BWRs has been the largest threat to the integrity of the primary containment vessel 36, and has constituted one of the limiting conditions to decide the upper limit of the output power of the nuclear reactor.

Since the internal pressure of the containment vessel 41 of this embodiment is remarkably reduced by the provision of the upper secondary containment vessel 42, it does not become a limiting condition for raising the output power of the nuclear reactor. Therefore, it is possible to raise the output power level of the nuclear reactor by arranging reactor internal pumps 60. Then, as a result, it is possible to dramatically reduce the cost of power generation per MWe base.

The passive-safety. BWR is required to store a large amount of cooling water in the reactor vessel because it is designed to use a gravity-driven cooling system. Thus, the reactor vessel has to be made very long (or high) to store such a large amount of cooling water, which results in raising the cost of construction at least in this regard. On the other hand, with this embodiment, it is not necessary at all to increase the dimensions of the reactor pressure vessel and those of the primary containment vessel to raise the output power level of the power plant. Therefore, this embodiment that is equipped with reactor internal pumps 60 and can raise the output power level results in a remarkable economic advantage.

Additionally, with the provision of the reactor internal pumps 60, it is possible to control the reactor power easily by changing the flow rate of coolant in the core, so that the control rods do not have to be operated frequently to control the reactor power. Then, as a result, it is possible to use a conventional rocking piston type control rod drive system having wider motion steps, which provides a remarkable advantage in cost reduction. With conventional passive-safety BWRs, it is necessary to use a fine motion type control rod drive system having fine motion steps, which is accompanied by a problem of high cost. In order to reduce the cost impact, conventional passive-safety BWRs have to reduce the number of control rods, which in turn becomes a difficult problem for core design.

Figure 10:
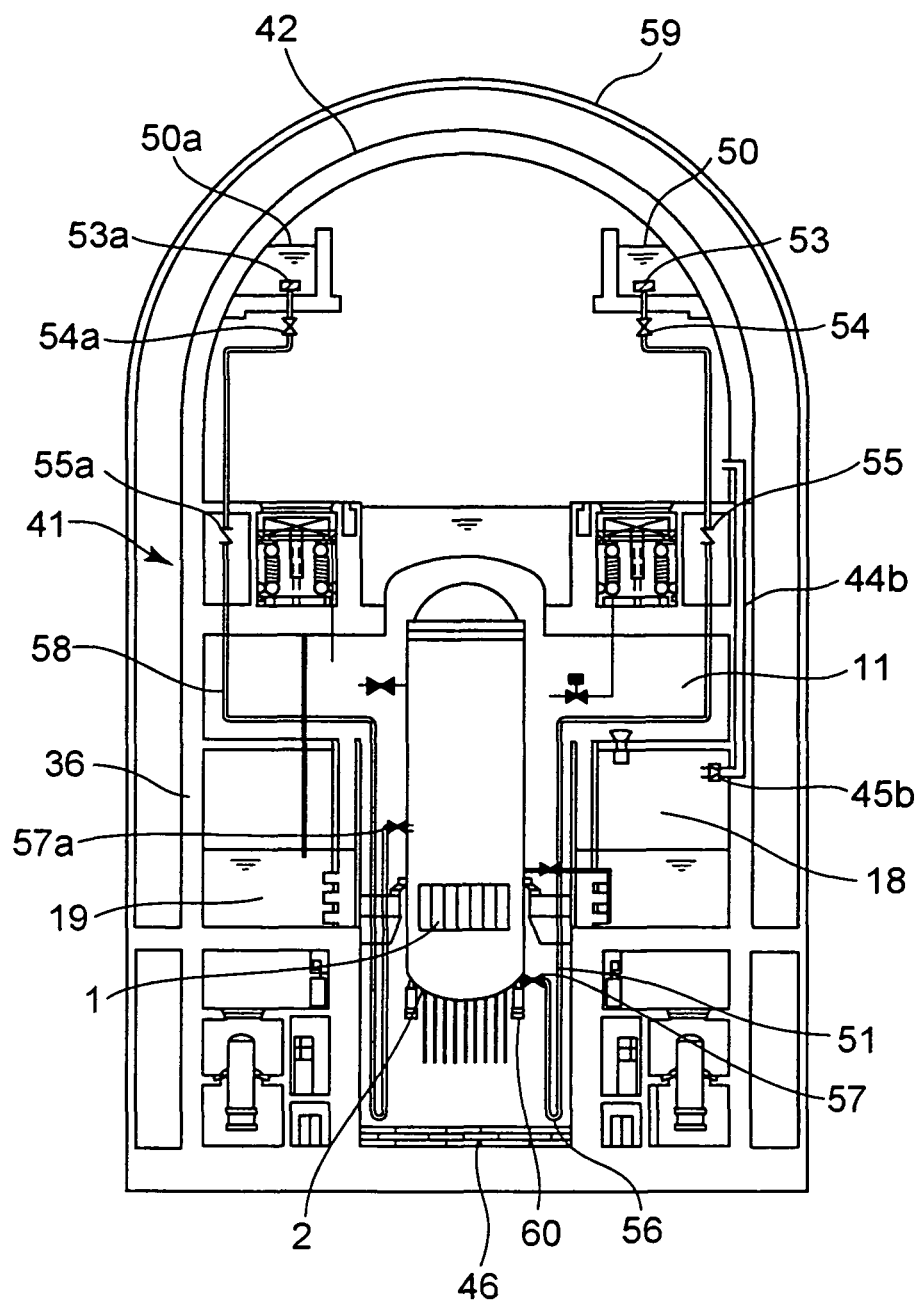
FIG. 10 is a schematic cross sectional elevation view of a tenth embodiment of a reactor containment vessel according to the present invention.

Now, the tenth embodiment of the containment vessel according to the present invention will be described by referring to FIG. 10. This embodiment is characterized in that: the gravity-driven containment vessel flooding system pools 50, 50*a* are arranged in the upper secondary containment vessel 42; and water is injected into the reactor pressure vessel 2 and the dry well 11 by way of a reactor pressure vessel injection pipe 58 and a dry well drain pipe 51.

With this embodiment having the above-described configuration, it is no longer necessary to provide a gravity-driven cooling system pool 37 (see FIG. 1) in the dry well 11, and hence can eliminate such a pool. Then, as a result, it is possible to effectively utilize the internal space of the dry well 11. In the conventional passive-safety BWRs, about ⅔ of the internal space of the upper dry well 14 is occupied by a gravity-driven cooling system pool 37 and the main steam pipe (not shown) and components are required to be arranged in the very narrow remaining space. However, since this embodiment does not require a gravity-driven cooling system pool, designing arrangement of equipment in the inside of the upper dry well 14 is much easier.

Figure 11:
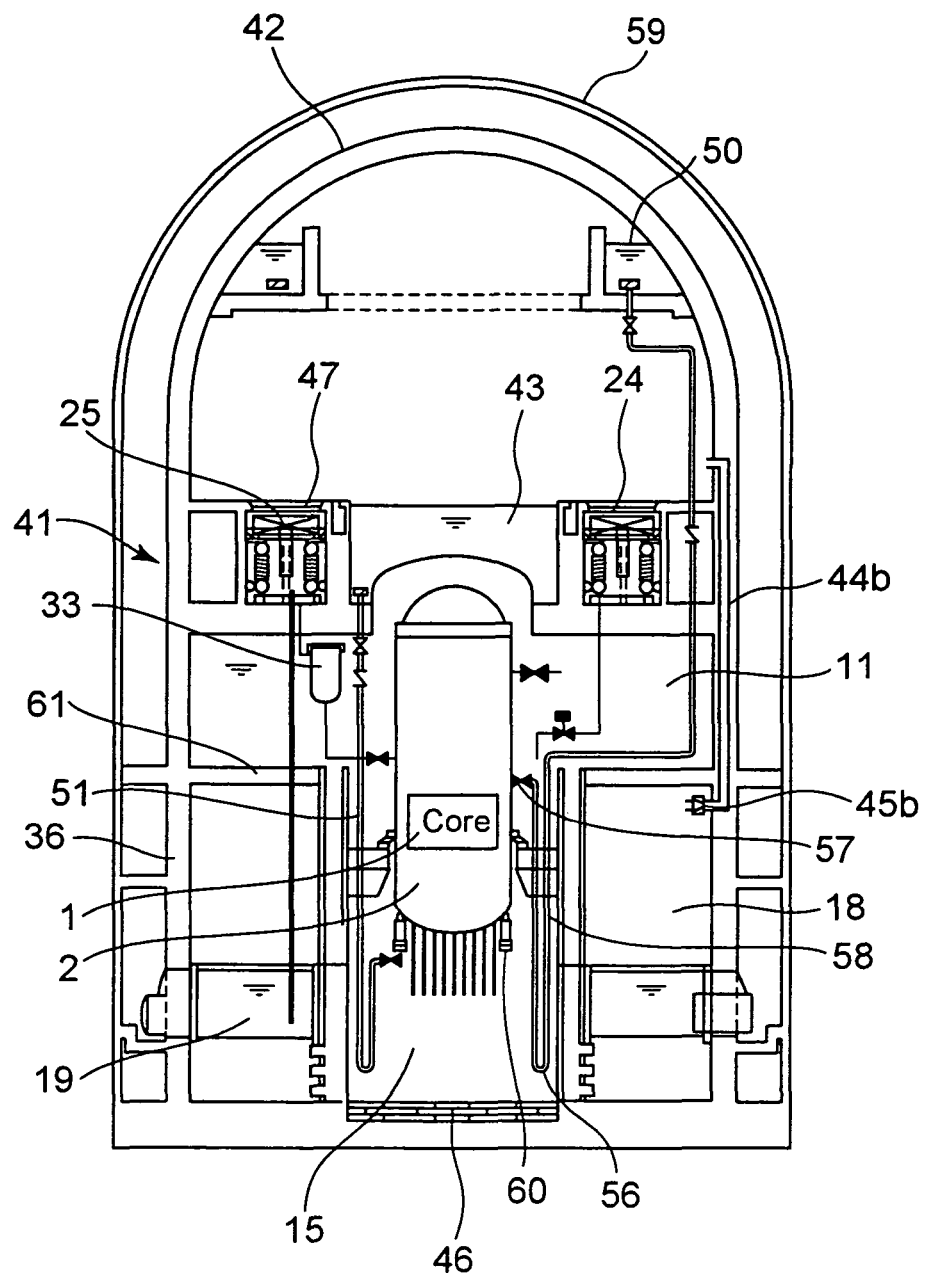
FIG. 11 is a schematic cross sectional elevation view of an eleventh embodiment of a reactor containment vessel according to the present invention.

Now, the eleventh embodiment of the containment vessel according to the present invention will be described by referring to FIG. 11. This embodiment is characterized in that a reactor pressure vessel 2 and a primary containment vessel 36 similar to those of an ABWR that is an active-safety reactor are arranged in the containment vessel. This embodiment resembles a conventional ABWR in that the pressure suppression pool 19 is located at the lowermost position of the primary containment vessel 36. The cooling water stored in the pressure suppression pool 19 is to be used as source of water supply for the active emergency core cooling system and will be injected into the reactor pressure vessel 2 and the dry well 11 when a loss-of-coolant accident occurs.

This embodiment differs from the conventional ABWRs that are conventional active-safety reactors in that the reactor pressure vessel 2 is longer than its counterpart of an ABWR by about 2 m, so that the upper end of the core 1 is located at a position lower than the diaphragm floor 61. Therefore, when cooling water is injected by means of an active emergency core cooling system and floods the inside of the lower dry well 15, the top of the core 1 is also submerged with water. The cooling water in the comes into the reactor pressure vessel 2 by way of a broken pipe or a squib valve (not shown) to flood the core 1.

This embodiment differs from the conventional ABWRs also in that the gravity-driven containment vessel flooding system pool 50 is arranged in the dome part of the upper secondary containment vessel 42. With this arrangement, it is possible to inject cooling water into the reactor pressure vessel 2 by way of the reactor pressure vessel injection pipe 58 to cool the core 1. This embodiment further differs from conventional ABWRs in that cooling water is injected into the lower dry well 15 from the water shield 43 by way of the dry well drain pipe 51 to cool the molten core that may have fallen into the core catcher 46 in a severe accident.

In conventional ABWRs, the internal pressure of the primary containment vessel 36 rises once a loss-of-coolant accident occurs. Therefore, even if a gravity-driven containment vessel flooding system pool 50 is provided, it is not possible to inject water into the inside of the primary containment vessel 36 from the outside thereof simply by gravity against the internal pressure. However, with this embodiment, the isolation and connection switching system 45b is actuated to substantially equalize the internal pressure of the wet well 18 and that of the upper secondary containment vessel 42. The difference between the internal pressure of the dry well 1 and that of the wet well 18 is decided by the depth of submergence (several meters) of the vent pipe 20 and about 0.5 atm at most. Therefore, with providing several meters for the level difference between the water injecting position and the water source both for the gravity-driven containment vessel flooding system pool 50 and the water shield 43, it is possible to inject cooling water into the dry well 11 owing to the water head difference.

With this embodiment having the above-described configuration, though being an active-safety nuclear reactor like an ABWR, it is possible to keep on cooling the core even after the active emergency core cooling system fails to operate. In other words, the containment vessel of this embodiment can maintain the safety of the nuclear reactor passively. With this concept of a nuclear power plant, the active emergency core cooling system is composed redundantly and independently from the passive-safety system comprising the gravity-driven containment vessel flooding system pool 50 and the water shield 43, which establishes a redundant (in-depth) safety system, and provides an advantage that the safety level of the nuclear reactor is much enhanced by in-depth protection.

Note that a passive containment cooling system drain tank 33 is arranged on the way of the pipe connecting a passive containment cooling system pool 25 and the reactor pressure vessel 2.

Figure 12:
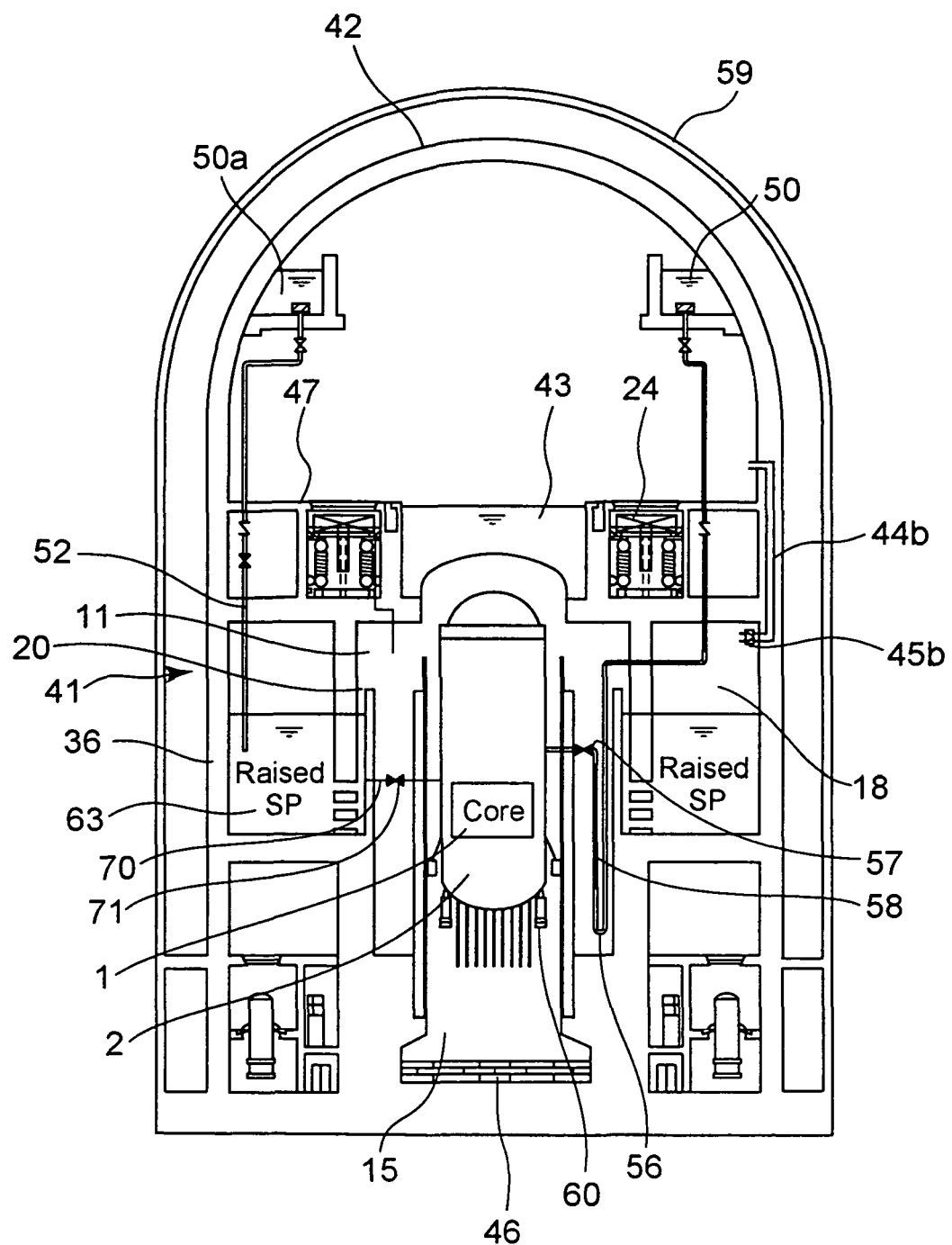
FIG. 12 is a schematic cross sectional elevation view of a twelfth embodiment of a reactor containment vessel according to the present invention.

Now, the twelfth embodiment of the containment vessel according to the present invention will be described by referring to FIG. 12. In this embodiment, the wet well 18 is located at the uppermost part of the primary containment vessel 36. A pressure suppression pool of this type is referred to as an upper pressure suppression pool (raised pressure suppression pool) 63 for the sake of convenience. The water level can be held higher than the core 1 in the upper pressure suppression pool 63. Therefore, it is possible to lead water from the inside of the raised pressure suppression pool 63 into the reactor vessel 2 by way of a pipe 70 and a squib valve 71.

Although raised pressure suppression pool type primary containment vessels are known, they tend to show a large volume of the lower dry well 15 because the main steam pipe and other related components are led out from a lower part of the raised pressure suppression pool 63 to the outside. Then, as a result, the pressure suppression pool is required to contain water to a large depth in order to secure a large amount of water in the pressure suppression pool that is enough for completely flooding the lower dry well 15 when a loss-of-coolant accident occurs. This is because cooling water cannot be returned to the raised pressure suppression pool 63 unless the inside of the dry well 11 is flooded to the inlet part of the vent pipe 20 and hence a large amount of water has to be held in the raised pressure suppression pool 63 from the very beginning.

Then, as a result, the volume of the gas-phase part of the wet well 18 is inevitably reduced. Therefore, the internal pressure of the primary containment vessel can become unacceptably high if an accident occurs. To avoid such a contradiction, it is necessary to increase the inner diameter of the primary containment vessel 36 in order to secure a sufficient amount of water and the pressure suppression pool is made shallow. However, such an arrangement is economically not feasible. Although an arrangement can be made to inject additional cooling water from the outside, then a separate and dedicated pump is required besides the emergency core cooling system, which gives rise to a problem in the economic feasibility and reliability. Under these circumstances, no nuclear reactor having such a raised pressure suppression pool has been manufactured to date.

With the embodiment having the above-described configuration, the internal pressure of the gas-phase part of the wet well 18 is discharged into the upper secondary containment vessel 42 by way of the isolation and connection switching system 45b and the gas-phase vent pipe 44b. Thus, it is no longer necessary to increase the height of the gas-phase part of the wet well 18 for the purpose of securing a sufficient volume for the gas-phase part of the wet well 18. Then, it is possible to raise the water level in the raised pressure suppression pool 63 and secure a large amount of water in the pressure suppression pool. Additionally, since the internal pressure of the wet well 18 and that of the upper secondary containment vessel 42 are equalized for the same reason, it is easy to supply cooling water from the gravity-driven containment vessel flooding system pool 50a arranged in the upper secondary containment vessel 42 to the raised pressure suppression pool 63 by gravity. Then, as a result, it is possible to minimize the amount of water in the raised pressure suppression pool 63.

Additionally, with this embodiment, when an accident occurs, it is possible to inject water from the gravity-driven containment vessel flooding system pool 50 into the reactor pressure vessel 2 by way of the reactor pressure vessel injection pipe 58. Thus, the core 1 is cooled while cooling water flows out from the broken pipe (not shown) connected to the reactor pressure vessel 2. Then, the inside of the dry well 11 is flooded to the inlet part of the vent pipe 20. With this embodiment, once the dry well 11 is flooded and cooling water is driven to circulate back to the raised pressure suppression pool 63, it is no longer necessary to keep on operating the active emergency core cooling system.

The level difference between the top of the core and the water level of the raised pressure suppression pool can be increased in this embodiment compared with the above-described eleventh embodiment. Therefore, this embodiment provides an advantage that the core can highly reliably be held in a flooded state in an accident. Additionally, the dry well 11 is flooded completely up to the inlet part of the vent pipe 20, so that the reactor pressure vessel 2 is flooded by about ⅔, and the core 1 is completely flooded in water. Then, as a result, it is possible to prevent a lower part of the reactor pressure vessel 2 from melting through when a severe accident occurs, and hence hold the molten core in the reactor pressure vessel 2.

Additionally, with this embodiment, it is possible to flood the core 1 in water and cool it without problem even if an extreme incident such as falling off of the reactor internal pump 60 from the reactor pressure vessel 2 took place. Still additionally, while the containment vessel could be heated and damaged by heat radiated from the molten core remaining in the reactor pressure vessel 2 when a severe accident occurred in a conventional nuclear reactor, it is possible to avoid such heating and damage in this embodiment because the core 1 and the reactor pressure vessel 2 are flooded in water almost totally. Thus, with this embodiment, it is possible to practically fully flood the inside of the primary containment vessel 36 without resorting to external power and external water supply and hence achieve a very high safety level that conventional light-water reactors can never achieve.

The embodiments of the nuclear reactor containment vessels in accordance with the present invention explained above are merely examples, and the present invention is not restricted thereto. It is, therefore, to be understood that, within the scope of the appended claims, the present invention can be practiced in a manner other than as specifically described herein.

For example, while the gas-phase vent pipe 44b and the isolation and connection switching system 45b of the third embodiment can be applied to the fourth through twelfth embodiments in the above-description, the gas-phase vent pipe and the isolation and connection switching system of either the first embodiment or the second embodiment may alternatively be applied to those embodiments.

What is claimed is:

1. A reactor containment vessel comprising:
   an outer wall of the reactor containment vessel;
   a dry well containing a reactor pressure vessel that contains a core, an outer wall part of the dry well partly constituting the outer wall of the reactor containment vessel;
   a wet well containing a pressure suppression pool communicated with the drywell by way of a vent pipe, an outer wall part of the wet well partly constituting the outer wall of the reactor containment vessel;
   a primary containment vessel including the dry well and the wet well;
   an upper secondary containment vessel arranged above the primary containment vessel and partly constituting the outer wall of the reactor containment vessel; and
   a gas-phase vent pipe communicating a gas-phase of the wet well and the upper secondary containment vessel so as to equalize a pressure in the gas-phase of the wet well and a pressure in the upper secondary containment vessel by releasing a non-condensable gas in the gas-phase of the wet well to the upper secondary containment vessel and limit a pressure in the primary containment vessel below a design pressure of the primary containment vessel even if a severe accident occurs,
   wherein the primary containment vessel and the upper secondary containment vessel are integrally forming the reactor containment vessel as a single structure so as to provide an enhanced strength.

2. The reactor containment vessel according to claim 1, further comprising an isolation and connection switching system arranged on the gas-phase vent pipe.

3. The reactor containment vessel according to claim 2, wherein the isolation and connection switching system is arranged outside the primary containment vessel and the upper secondary containment vessel.

4. The reactor containment vessel according to claim 2, wherein both of the gas-phase vent pipe and the isolation and connection switching system are arranged inside the primary containment vessel or the upper secondary containment vessel.

5. The reactor containment vessel according to claim 1, wherein the gas-phase vent pipe is at least partly embedded in the wall of the primary containment vessel.

6. The reactor containment vessel according to claim 1, wherein:
   the upper secondary containment vessel comprises an operation floor so as to share a pressure in the reactor containment vessel during a severe accident; and
   the reactor containment vessel further comprising a primary containment vessel head made of steel and arranged right above the reactor pressure vessel so as to open the primary containment vessel for refueling and to partition the primary containment vessel and the upper secondary containment vessel.

7. The reactor containment vessel according to claim 1, further comprising an igniter arranged in the upper secondary containment vessel.

8. The reactor containment vessel according to claim 1, wherein atmosphere in the upper secondary containment vessel is replaced by nitrogen so as to be held in a state where oxygen concentration is lower than that of ordinary air.

9. The reactor containment vessel according to claim 1, further comprising:
   a gravity-driven containment vessel flooding system pool arranged in the upper secondary containment vessel storing cooling water and having a water surface opened directly to the gas-phase above the operation floor in the upper secondary containment vessel so as to use a pressure of the upper secondary containment vessel for helping injection of cooling water; and
   an injection pipe system having an injection pipe for leading cooling water from the gravity-driven containment vessel flooding system pool to the primary containment vessel.

10. The reactor containment vessel according to claim 1, further comprising:
    a gravity-driven containment vessel flooding system pool positioned on the primary containment vessel head storing cooling water to be used as a water shield pool during a power operation and having a water surface opened directly to the gas-phase above the operation floor in the upper secondary containment vessel so as to use a pressure of the upper secondary containment vessel for helping injection of cooling water; and
    an injection pipe system including an injection pipe that leads cooling water from the gravity-driven containment vessel flooding system pool to the primary containment vessel.

11. The reactor containment vessel according to claim 10, wherein:
    the dry well includes a lower dry well;
    the injection pipe of the injection pipe system is a dry well drain pipe for leading cooling water from the inside of the gravity-driven containment vessel flooding system pool to the lower dry well bypassing the reactor pressure vessel; and a combination of a check valve and a U-shaped seal is fitted to the dry well drain pipe so as to maintain a pressure difference between the dry well and the wet well after cooling water in the gravity-driven containment vessel flooding system pool is depleted.

12. The reactor containment vessel according to claim 10, wherein:

the injection pipe of the injection pipe system is a reactor pressure vessel injection pipe for leading cooling water from the inside of the gravity-driven containment vessel flooding system pool to the reactor pressure vessel;

a depressurization valve is arranged on the reactor pressure vessel to reduce the internal pressure of the reactor pressure vessel; and a combination of a check valve and a U-shaped seal is fitted to the reactor pressure vessel injection pipe so as to maintain a pressure difference between the dry well and the wet well after cooling water in the gravity-driven containment vessel flooding system pool is depleted.

13. The reactor containment vessel according to claim 10, wherein the injection pipe of the injection pipe system is a wet well drain pipe for leading cooling water from the inside of the gravity-driven containment vessel flooding system pool to the wet well and bypassing the reactor pressure vessel.

14. The reactor containment vessel according to claim 1, further comprising a concrete-made external event shield covering the primary containment vessel and the upper secondary containment vessel from outside.

15. A boiling water reactor plant comprising:
an outer wall of a reactor containment vessel;
a reactor pressure vessel;
a dry well containing the reactor pressure vessel that contains a core, an outer wall part of the dry well partly constituting the outer wall of the reactor containment vessel;
a wet well containing a pressure suppression pool communicated with the dry well by way of a vent pipe, an outer wall part of the wet well partly constituting the outer wall of the reactor containment vessel;
a primary containment vessel including the dry well and the wet well;
an upper secondary containment vessel arranged above the primary containment vessel and partly constituting the outer wall of the reactor containment vessel; and
a gas-phase vent pipe communicating a gas-phase of the wet well and the upper secondary containment vessel so as to equalize a pressure in the gas-phase of the wet well and a pressure in the upper secondary containment vessel by releasing a non-condensable gas in the gas-phase of the wet well to the upper secondary containment vessel and limit a pressure in the primary containment vessel below a design pressure of the primary containment vessel even if a severe accident occurs,
wherein the primary containment vessel and the upper secondary containment vessel are integrally forming the reactor containment vessel as a single structure so as to provide an enhanced strength.

16. The power plant according to claim 15, further comprising an isolation and connection switching system arranged on the gas-phase vent pipe.

* * * * *